United States Patent
Wen et al.

(10) Patent No.: US 10,144,450 B1
(45) Date of Patent: Dec. 4, 2018

(54) HYDRAULIC SYSTEM FOR A STEERING SYSTEM OF A VEHICLE

(71) Applicant: Caterpillar Inc., Peoria, IL (US)

(72) Inventors: Gang Wen, Champaign, IL (US); Travis Neale Richards, Chillicothe, IL (US); Matthew David Roley, Morton, IL (US); Nathanael Garnet McRostie, Yorkville, IL (US); Dwanz Mwalimu Mwasi, Decatur, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/613,684

(22) Filed: Jun. 5, 2017

(51) Int. Cl.
*B62D 5/30* (2006.01)
*B62D 5/09* (2006.01)
*B62D 5/06* (2006.01)

(52) U.S. Cl.
CPC .............. *B62D 5/09* (2013.01); *B62D 5/062* (2013.01); *B62D 5/30* (2013.01)

(58) Field of Classification Search
CPC . B62D 5/06; B62D 5/062; B62D 5/09; B62D 5/30
USPC ........................................ 180/405, 406, 441
See application file for complete search history.

(56) References Cited

U.S. PATENT DOCUMENTS

| | | | |
|---|---|---|---|
| 3,976,158 A | 8/1976 | Shaffer | |
| 4,076,096 A * | 2/1978 | Hushower | B62D 5/32 180/406 |
| 4,422,290 A | 12/1983 | Huffman | |
| 4,476,677 A | 10/1984 | Hanshaw | |
| 4,574,904 A | 3/1986 | Goode | |
| 4,942,935 A | 7/1990 | Lech | |
| 6,250,416 B1 * | 6/2001 | Pluschke | B60R 25/02 180/404 |
| 2006/0086087 A1 * | 4/2006 | Phillips | B62D 5/065 60/384 |
| 2008/0135325 A1 * | 6/2008 | Stuhldreher | B62D 5/065 180/442 |
| 2013/0037340 A1 * | 2/2013 | Brinkley | B62D 5/06 180/421 |

* cited by examiner

*Primary Examiner* — Tony H Winner
(74) *Attorney, Agent, or Firm* — William R. Tinker

(57) ABSTRACT

A hydraulic system is provided for a steering system of a vehicle. The hydraulic system includes a pump that supplies pressurized fluid during an operation of the steering system. The hydraulic system also includes an accumulator that is in independent and selective communication with each of the pump and the steering system. When the pump is in the operational state to support the operation of the steering system, some of the fluid may be routed into the accumulator and stored in the accumulator for later use. In the event of failure of the pump when the steering system is in operation, the accumulator provides the required amount of fluid to continue operation of the steering system until charge in the accumulator depletes to a value that is no longer sufficient to support operation of the steering system.

20 Claims, 2 Drawing Sheets

HYDRAULIC SYSTEM FOR A STEERING SYSTEM OF A VEHICLE

TECHNICAL FIELD

The current disclosure relates to a vehicle, and more particularly to a hydraulic system for co-operating with a steering system of a vehicle.

BACKGROUND

Typically, a vehicle may include a steering system to help an operator steer the vehicle on a ground surface. Conventionally known steering systems may include a pump for operatively supplying pressurized fluid to one or more steering actuators of the vehicle so that the steering actuators can perform the steering functionality with the help of one or more wheels associated with the vehicle.

Sometimes, it may be possible that the pump may fail to operate as intended or the pump may not work at all. During such time, it is required for a back-up emergency steering system to take control of the steering functionality of the vehicle. An example of one such system is disclosed in U.S. Pat. No. 4,574,904 (hereinafter referred to as "the '904 patent"). The '904 patent discloses an auxiliary hydraulic steering system for use in mobile vehicles. This auxiliary hydraulic steering system has an engine-driven pump that supplies hydraulic fluid under pressure to a steering control unit and an accumulator. The accumulator is charged with fluid under pressure from the pump through a charger/discharge valve and connects with a supply line to the steering control unit only when the charge/discharge valve shifts in response to a predetermined pressure in said supply line.

Although the configuration of the auxiliary hydraulic steering system from the '904 patent provides for an accumulator that is charged with fluid under pressure at a first instant in time for use during a subsequent period of time, the auxiliary hydraulic steering system of the '904 patent does not provide a means for continuously charging the accumulator with the pressurized fluid from the pump during operation of the steering control unit so that at the same or a later instant of time, for instance, if the load on the steering actuators increases, the accumulator can simultaneously co-operate with the pump in actuating movement of the steering control unit and help reduce an amount of load on the pump.

Hence, there is a need for an improved hydraulic steering system that is simple in construction yet effective in overcoming the aforementioned drawbacks.

SUMMARY OF THE DISCLOSURE

In one aspect of the current disclosure, a hydraulic system for a steering system of a vehicle includes a pump that is configured to output pressurized fluid via a primary supply line coupled to an output port of the pump. The hydraulic system further includes a priority valve disposed downstream of the pump and located in the primary supply line. The priority valve is configured to allow pressurized fluid from the pump to selectively flow to the steering system via a secondary supply line disposed downstream of the priority valve and coupled to the steering system.

Further, the hydraulic system also includes a first branch line that is configured to branch-off from the primary supply line. The first branch line has a spring-loaded pilot-operated pressure reducing valve having a pre-set reducing pressure for opening the pressure reducing valve in accordance with the pre-set reducing pressure, and an accumulator disposed downstream of the pressure reducing valve and fluidly coupled thereto. The first branch line is configured to charge the accumulator with pressurized fluid from the pump when the pump is normally operational and the pressurized fluid from the pump is equal to or greater than the pre-set reducing pressure associated with the pressure reducing valve.

Furthermore, the hydraulic system also includes a second branch line configured to branch-off from the secondary supply line and fluidly couple with the accumulator. The second branch line is configured to communicate pressurized fluid from the accumulator to the steering system via the secondary supply line for facilitating operation of the steering system when the pump is non-operational.

In another aspect of this disclosure, the first branch line includes a first check valve disposed therein and located between the pressure reducing valve and the accumulator. The first check valve is configured to prevent a flow of pressurized fluid from the accumulator to the pressure reducing valve. As such, the first check valve is set to open with a pressure setting lower than the pre-set reducing pressure of the pressure reducing valve to facilitate a unidirectional flow of pressurized fluid from the pump to the accumulator via the pressure reducing valve. Additionally or optionally, the hydraulic system may include a first orifice disposed in the first branch line and located between the first check valve and the accumulator. The first orifice is configured to regulate a flow-rate of pressurized fluid from the pressure reducing valve to the accumulator.

In yet another aspect of this disclosure, the hydraulic system further includes a third branch line configured to branch-off from a point in the first branch line between the pressure reducing valve and the first check valve. The third branch line includes a third check valve disposed therein. The third check valve is configured to allow a unidirectional flow of pressurized fluid from the pressure reducing valve for regulating a displacement of the pump via a resolver valve and a pressure differential system located sequentially between the third check valve and the pump.

In yet another aspect of this disclosure, the hydraulic system further includes a second check valve disposed in the second branch line and located between the accumulator and the secondary supply line. The second check valve is configured to allow fluid to flow from the accumulator to the steering system via the second branch line when the pump is non-operational and a pressure of fluid in the secondary supply line becomes less than a pressure of fluid in the accumulator.

In yet another aspect of this disclosure, the hydraulic system may further include a bypass line disposed in parallel to the second check valve and fluidly coupled to the second branch line upstream and downstream of the second check valve. The bypass line has a second orifice disposed therein for regulating a flow-rate of fluid being routed from the secondary supply line to the accumulator via the bypass line. The second orifice is configured to allow fluid to return from the steering system to the accumulator via the bypass line when the steering system is operational, and fluid to flow from the accumulator to the steering system via the bypass line when the steering system is non-operational.

In yet another aspect of this disclosure, the hydraulic system may further include a first sensor, a second sensor, and a controller disposed in communication with the first and second sensors. The first sensor may be associated with the accumulator and configured to output a pressure of fluid present in the accumulator. The second sensor may be disposed in the second branch line and located at a point between the second check valve and the accumulator. The second sensor is configured to output a pressure of fluid upstream of the accumulator.

In regards to the preceding aspect disclosed above, the controller is configured to determine from the outputs of the first and second pressure sensors if the pressure of fluid upstream of the accumulator is below a pre-determined level, and if the pressure of fluid in accumulator has fallen coterminous with a loss of pressure upstream of the accumulator. If so, the controller may be further configured to provide a warning signal via a display device communicably coupled to the controller. The warning signal being provided via the display device would be suggestive of halting the vehicle.

Embodiments of this disclosure have also been directed to a vehicle having a steering system and employing the hydraulic system of the present disclosure.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
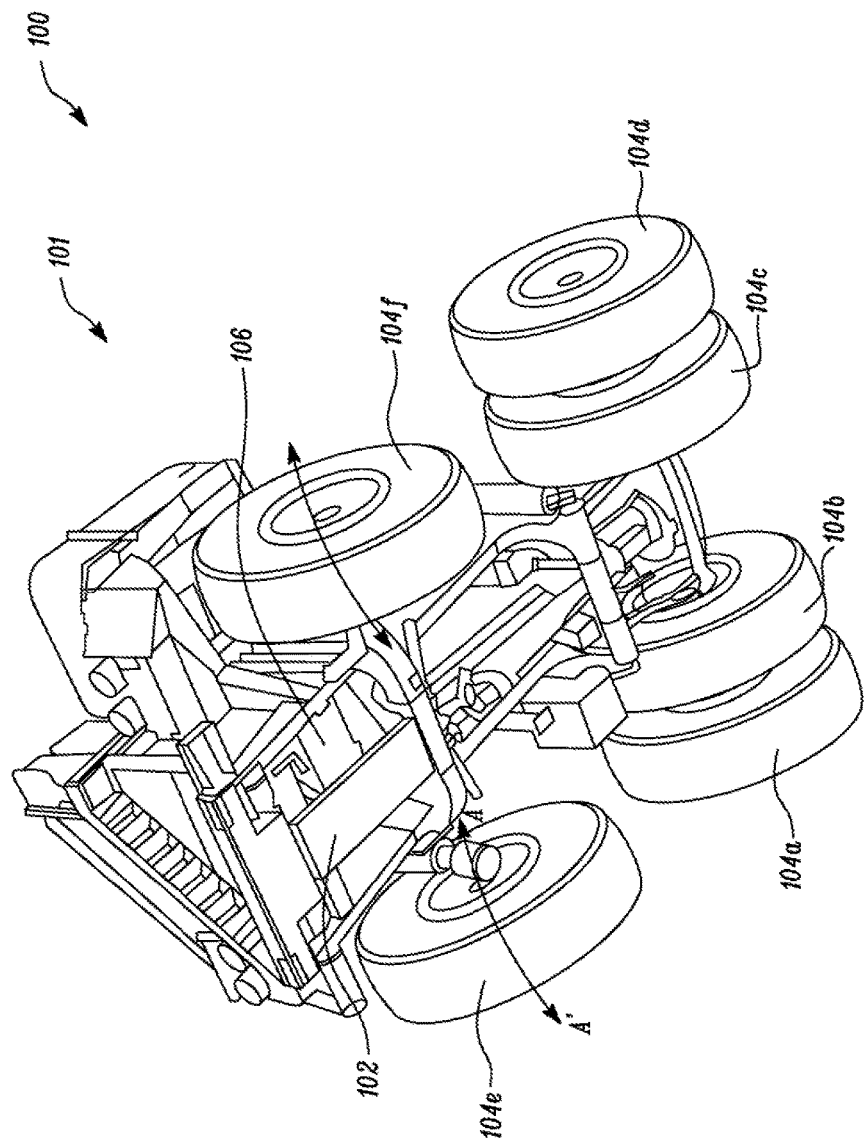
FIG. 1 is a bottom perspective view of an exemplary vehicle having a frame and wheels rotatably supported on the frame.

FIG. 1 illustrates an exemplary vehicle 100. The vehicle 100 may be a mobile machine that performs some type of operation associated with an industry such as mining, construction, farming, transportation or any other industry known in the art. In an example as shown in FIG. 1, the vehicle 100 may be embodied as a mining truck 101.

Although the vehicle 100 shown in FIG. 1 is embodied in the form of a mining truck 101, in other embodiments, the vehicle 100 may be embodied as a dozer, a loader, a backhoe, an excavator, a motor grader, or any other earth moving machine known to persons skilled in the art. Moreover, the vehicle 100 may also include other operation-performing work machines such as a truck having a generator set mounted thereon, or a truck having one or more rig pumps mounted thereon. It will be acknowledged that a type of vehicle used for implementing embodiments disclosed herein is non-limiting of this disclosure, and as such, vehicle 100 may embody any type of mobile machine including passenger cars, but not limited thereto. Rather, it will be appreciated by persons skilled in the art that aspects of the present disclosure may be applied to any type of vehicle having a frame and wheels as will be evident from the following disclosure.

As shown in FIG. 1, the vehicle 100 may include a frame 102, and a plurality of wheels 104 rotatably supported on the frame 102. The wheels 104 may include a set of front wheels 104e-104f and a set of rear wheels 104a-104d. The set of front wheels 104e-104f are rotatably mounted on to the frame 102 at a front end or portion of the vehicle 100. The set of rear wheels 104a-104d are rotatably mounted on to the frame 102 at a rear end or portion of the vehicle 100.

In one embodiment, the set of front wheels 104e-104f are powered by a prime mover 106. In another embodiment, the set of rear wheels 104a-104d may be powered by the prime mover 106. In yet another embodiment, the set of front wheels 104e-104f and the set of rear wheels 104a-104d are powered by the prime mover 106. The prime mover 106 disclosed herein may include, but is not limited to, an engine, an electric motor, or any other type of prime mover known to persons skilled in the art for propelling the vehicle 100 on a ground surface.

With continued reference to FIG. 1, the set of front wheels 104 may also be used for accomplishing the steering functionality of the vehicle. The set of front wheels 104 may therefore include a right steering wheel 104e disposed at a right side of the vehicle 100, and a left steering wheel 104f disposed at a left side of the vehicle 100.

In operation, the set of steering wheels 104e, 104f allows an operator of the vehicle 100 to steer the vehicle 100 on a path of travel. As shown in FIG. 1, each of the right and left front wheels 104e, 104f are configured to be actuated by a steering system 202 disclosed in FIG. 2 to pivot, and, in one embodiment, to mutually and correspondingly pivot for operatively executing a swiveling movement of the wheels 104e, 104f shown by way of directional arrows AA'.

Figure 2:
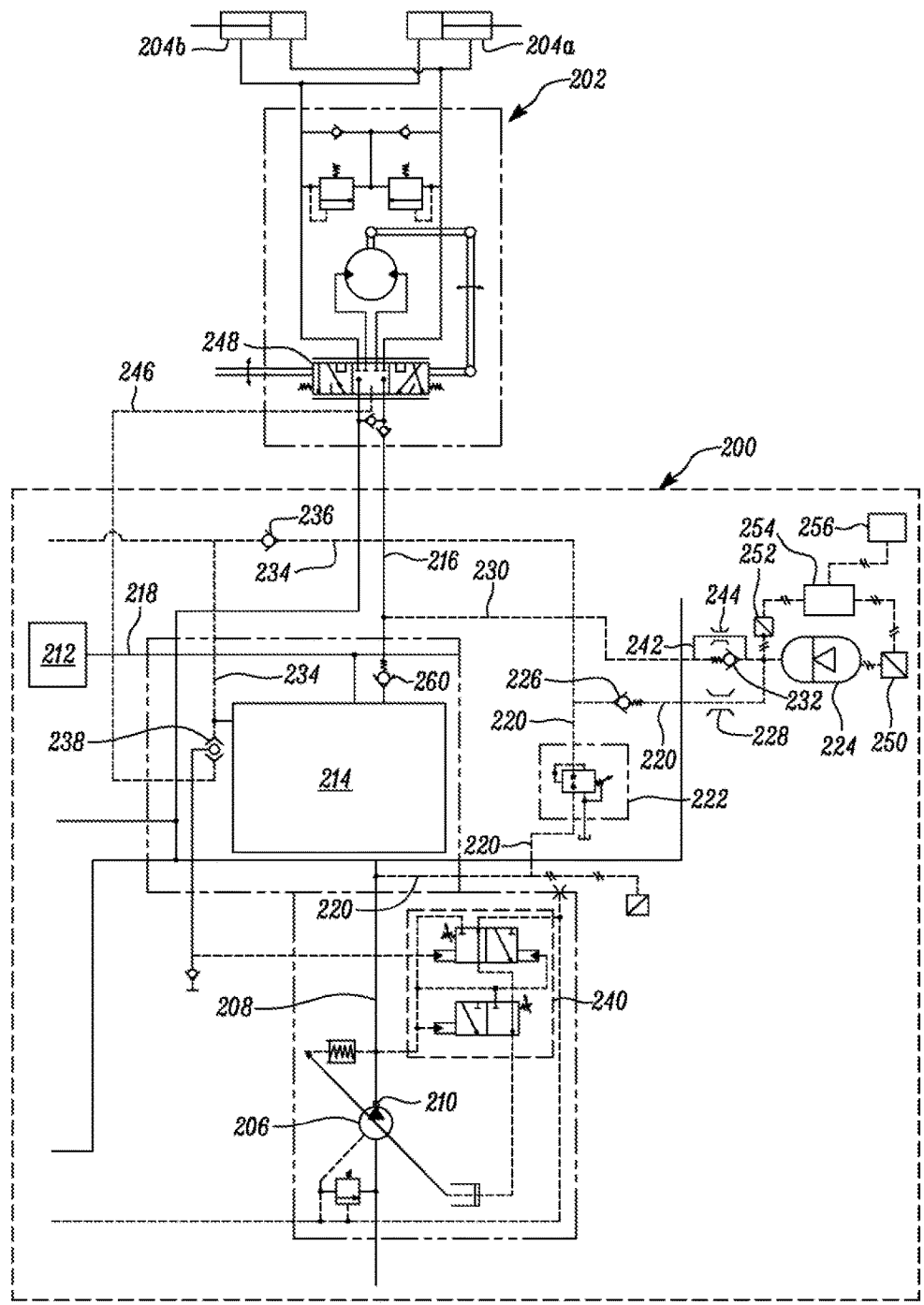
FIG. 2 is a schematic of a hydraulic system for a steering system of the exemplary vehicle, according to embodiments of the present disclosure.

The present disclosure relates to a hydraulic system 200, as shown in FIG. 2, for a steering system 202 employed by the exemplary vehicle 100 of FIG. 1. Referring to FIGS. 1 and 2, the steering system 202 employed by the vehicle 100 may include a pair of actuators 204a, 204b that are associated with and engaged to the wheels 104e, 104f with respect to the frame 102 of the vehicle 100 to effectuate the pivotal or swiveling movement of the wheels 104e, 104f and hence, effectuate the steering of the vehicle 100. One of the actuators, for example, actuator 204a may be associated with the wheel 104e while the other of the actuators, for example, actuator 204b may be associated with the wheel 104f.

Referring to FIG. 2, the hydraulic system 200 includes a pump 206. As shown in the illustrated embodiment of FIG. 2, the pump 206 is embodied, for instance, in the form of a variable displacement pump 206 whose displacement can be varied based, on among other things, a desired or commanded extent or range of pivotal or swiveling and steering movement of the wheels 104e, 104f, or an amount of payload associated with the vehicle 100 that manifests itself as a resistance to the steering movement of the wheels 104e, 104f as the vehicle 100 is in operation. The pump 206 is configured to output pressurized fluid via a primary supply line 208 coupled to an output port 210 of the pump 206. Additionally or optionally, the pump 206, employed for use in powering the steering system 202, may also be used to power at least one other auxiliary hydraulic system 212 that is present on the machine.

The hydraulic system 200 also includes a priority valve 214 disposed downstream of the pump 206 and located in the primary supply line 208. The priority valve 214 is configured to allow pressurized fluid from the pump 206 to selectively flow to the steering system 202 via a secondary supply line 216 disposed downstream of the priority valve 214 and coupled to the steering system 202. It is hereby contemplated that when the steering system 202 is being operated, the priority valve 214 shifts to a first operating position to allow pressurized fluid from the pump 206 to be communicated to the steering system 202 via the secondary supply line 216, and when the steering system 202 is not in operation, the priority valve 214 shifts to a second operating position in which pressurized fluid from the pump 206 could be communicated to the auxiliary hydraulic system 212 via a tertiary supply line 218 that is provided in the hydraulic system 200 to fluidly couple the auxiliary hydraulic system 212 with the priority valve 214.

With regards to a configuration of the priority valve 214, it is hereby contemplated that the priority valve 214 may be embodied in the form of one or more electromagnetically operated valves, one or more hydro-mechanically operated valves, or any other suitable type of valve configuration known to persons skilled in the art. Therefore, it must be noted that a type of valve configuration used to form the priority valve 214 disclosed herein is non-limiting of this disclosure. Rather, any type of valve configuration known to persons skilled in the art may be used to form the priority valve 214 disclosed herein such that the priority valve 214 is configured to perform functions that are consistent with the present disclosure.

With continued reference to FIG. 2, the hydraulic system 200 also includes a first branch line 220 that is configured to branch-off from the primary supply line 208. A spring-loaded pilot-operated pressure reducing valve 222 is disposed in the first branch line 220. The relief valve 222 has a pre-set reducing pressure for opening the pressure reducing valve 222 in accordance with the pre-set reducing pressure setting. An accumulator 224 is also connected in fluid communication with the first branch line 220 and disposed downstream of the pressure reducing valve 222. The first branch line 220 is configured to direct pressurized fluid from the pump 206 to the accumulator 224 for charging the accumulator 224 when the pump 206 is normally operational and when the pressurized fluid from the pump 206 is equal to or greater than the pre-set reducing pressure associated with the pressure reducing valve 222.

As shown, the first branch line 220 further includes a first check valve 226 disposed therein and located between the pressure reducing valve 222 and the accumulator 224. The first check valve 226 is configured to prevent a flow of pressurized fluid from the accumulator 224 to the pressure reducing valve 222. As such, the first check valve 226 is set to open with a pressure setting lower than the pre-set reducing pressure of the pressure reducing valve 222 to facilitate a unidirectional flow of pressurized fluid from the pump 206 to the accumulator 224 via the pressure reducing valve 222. Additionally or optionally, the hydraulic system 200 may include a first orifice 228 disposed in the first branch line 220 and located between the first check valve 226 and the accumulator 224. The first orifice 228 is configured to regulate a flow-rate of pressurized fluid from the pressure reducing valve 222 to the accumulator 224.

Further, the hydraulic system 200 also includes a second branch line 230 configured to branch-off from the secondary supply line 216 and fluidly couple with the accumulator 224. The second branch line 230 is configured to communicate pressurized fluid from the accumulator 224 to the steering system 202 via the secondary supply line 216 for facilitating operation of the steering system 202 when the pump 206 is non-operational.

Moreover, the hydraulic system 200 further includes a second check valve 232 disposed in the second branch line 230 and located between the accumulator 224 and the secondary supply line 216. The second check valve 232 is configured to allow fluid to flow from the accumulator 224 to the steering system 202 via the second branch line 230 when the pump 206 is non-operational and a pressure of fluid in the secondary supply line 216 becomes less than a pressure of fluid in the accumulator 224.

Furthermore, the hydraulic system 200 further includes a third branch line 234 fluidly connected to branch-off from a point in the first branch line 220 between the pressure reducing valve 222 and the first check valve 226. The third branch line 234 includes a third check valve 236 disposed therein. The third check valve 236 is configured to allow a unidirectional flow of pressurized fluid from the pressure reducing valve 222 for regulating a displacement of the pump 206 via a resolver valve 238 and a pressure differential system 240 located sequentially between the third check valve 236 and the pump 206.

In an embodiment as shown in FIG. 2, the hydraulic system 200 may further include a bypass line 242 disposed in parallel to the second check valve 232 and fluidly coupled to the second branch line 230 upstream and downstream of the second check valve 232. The bypass line 242 has a second orifice 244 disposed therein for regulating a flow-rate of fluid being routed from the secondary supply line 216 to the accumulator 224 via the bypass line 242. The second orifice 244 not only allows fluid to flow from the accumulator 224 to the steering system 202 when the pump 206 is non-operational, but also communicates pressurized flow from the pump 206 via the secondary supply line 216 during normal pump operation so that the accumulator 224 can be charged with pressurized fluid from the pump 206 above the pre-set reducing pressure of the pressure reducing valve 222.

During operation of the vehicle 100, the pump 206 supplies pressurized fluid via the primary supply line 208. If the steering system 202 is being operated, then the priority valve 214 may shift to the first operating position so that pressurized fluid from the pump 206 can be communicated via the secondary supply line 216 to the steering system 202. Therefore, during this time, the steering system 202 receives pressurized fluid from the pump 206 via the priority valve 214 for accomplishing the steering function of the vehicle 100 vis-à-vis the pair of actuators 204a, 204b and the wheels 104e, 104f.

Some portion of this pressurized fluid from the primary supply line 208 may be routed into the first branch line 220. During this time, if the pressure of fluid from the pump 206 i.e., in the first branch line 220 is equal to or greater than the pre-set reducing pressure associated with the pressure reducing valve 222, then the pressure reducing valve 222 opens to allow fluid to flow downstream towards the first check valve 226. As the pressure setting of the first check valve 226 is kept at a value lower than the pre-set reducing pressure associated with the pressure reducing valve 222, the pressurized fluid downstream of the pressure reducing valve 222 biases the first check valve 226 to open and flow towards the first orifice 228. The first orifice 228 regulates a flow-rate of the pressurized fluid being routed into the accumulator 224. Upon regulating the flow-rate of the pressurized fluid, the accumulator 224 is charged with the pressurized fluid and the charge of pressurized fluid sent to the accumulator 224 has a pressure value corresponding to the pre-set reducing pressure of the pressure reducing valve 222.

It is hereby contemplated that the pre-set reducing pressure associated with the pressure reducing valve 222 would be maintained lower than an output pressure of fluid from the pump 206. Hence, with implementation of embodiments disclosed herein, during a normally operational state of the pump 206, the accumulator 224 receives pressurized fluid from the pump 206 in a continuous manner and hence, is likely to remain charged at all times.

If the pressure of fluid in the secondary supply line 216 decreases at any instant of time, for example, from the steering system 202 being operated under the influence of a higher-than-usual load demand while the pump 206 is normally operating with a displacement lower than that required to produce adequate pressure in meeting the higher-than-usual load demand of the steering system 202, then the accumulator 224 can discharge fluid into the steering system 202 via the second check valve 232 located in the second branch line 230 so that the flow of fluid from the pump 206 via the primary supply line 208 is supplemented with a flow of fluid from the accumulator 224. It should be noted that when the pressure of fluid in the secondary supply line 216 and the second branch line 230 between the secondary supply line 216 and the check valve decreases to a value that is below the pressure of fluid in the accumulator 224 corresponding to the pre-set reducing pressure of the pressure reducing valve 222, then the fluid from the accumulator 224 i.e., fluid at higher pressure biases the second check valve 232 into its open position for supplementing the flow of fluid from the pump 206 to the steering system 202.

Also, some portion of the pressurized fluid from the first branch line 220 downstream of the pressure reducing valve 222 is fluidly communicated or routed into the third branch line 234. The pressurized fluid in the third branch line 234 corresponds with the pre-set reducing pressure associated with the pressure reducing valve 222. The pressurized fluid in the third branch line 234 biases the third check valve 236 into its open position to allow a unidirectional fluid flow through the third check valve 236. Where the priority valve 214 is implemented by way of a hydro-mechanically operated valve, the pressure of fluid downstream of the third check valve 236 may be used to determine, at least in part, a positioning of the priority valve 214 into one of the first and second operating positions. This way, the priority valve 214, in particular, a hydro-mechanically operated priority valve 214 can be operated into moving between the first and second operating positions so that one of the steering system 202 and the auxiliary hydraulic system 212 receives pressurized fluid from the pump 206 at a given instant of time.

Further, the resolver valve 238 downstream of the third check valve 236 has two inputs—a) the pressure of fluid from the third branch line 234 downstream of the third check valve 236, and b) a pressure of fluid from a pilot return line 246 of a spool valve 248 associated with the steering system 202 which can be regarded for the purposes of this disclosure as "a feedback pressure signal" that is indicative of an amount of load demand on the steering system 202. These two inputs a) and b) to the resolver valve 238 can help vary a position of the resolver valve 238. In particular, the fluid having a higher pressure value from among one of the two inputs a) and b) helps bias the resolver valve 238 into a first position or a second position, as the case maybe. The higher fluid pressure input from one among a) and b) co-operates with pressure feedback signals from the pair of actuators 204a, 204b at the pressure differential system 240 for varying a displacement of the pump 206.

The pressure differential system 240 facilitates the pump 206 to maintain discharge pressure higher than the load demand (indicated by way of the feedback pressure signal at the resolver valve 238 which connects to the pressure reducing valve 222 downstream through the third check valve 236), by a set margin, which in turn enforces the pressurized fluid supply downstream of the fourth check valve 260 to be higher than the pre-set reducing pressure of the pressure reducing valve 222 (by an amount that is commensurate with the aforementioned "margin" while neglecting a pressure drop across the priority valve 214). This higher pressure of fluid downstream of the fourth check valve 260 facilitates charging of the accumulator 232 with the fluid through the second branch line 230 and the second orifice 244 until a discharge pressure of fluid from the pump 206 becomes less than the pre-set reducing pressure of the pressure reducing valve 222 plus the "margin" when there is no steering operation in process, or until the discharge pressure of fluid from the pump 206 becomes less than the load demand, indicated by way of the feedback pressure signal at the resolver valve 238, by the "margin" during normal operation of the pump 206. This way, due to the feedback pressure signal from the third check valve 236 which conveys the pressure reducing valve 222 set pressure and the load pressure signal to the resolver valve 238, during non-operation or normal operation of the pump 206, the accumulator 232 is charged by the pump 206, through the priority valve 214 and the fourth check valve 260, with fluid having a pressure that is either higher than the preset reducing pressure of the pressure reducing valve 222, or higher than the load demand, whichever is higher.

During a non-operational state of the pump 206 i.e., when the pump 206 is not supplying any pressurized fluid therefrom, a pressure drop in the primary supply line 208 causes a pressure drop in the secondary supply line 216. This drop in pressure may be large when compared to the foregoing example in which the displacement of the pump 206 may be insufficient to generate the pressure of fluid required for operating the steering system 202 with a higher-than-usual load demand. This large drop in pressure of fluid in the secondary supply line 216 and the second branch line 230 between the secondary supply line 216 and the second check valve 232 may be insufficient to bias the second check valve 232 into its closed position. Rather, the pressure of fluid from the accumulator 224 becomes greater than the pressure of fluid from the secondary supply line 216 and the second branch line 230 between the secondary supply line 216 and the second check valve 232 and this high pressure fluid from the accumulator 224 biases the second check valve 232 to open and supply the charge of previously stored pressurized fluid from the accumulator 224 to the steering system 202.

Also, when the pump 206 is non-operational and fluid is routed from the accumulator 226 to the steering system 202, a fourth check valve 260 disposed in the secondary supply line 216 and located at a point between the priority valve 214 and the second branch line 230 would be biased into a closed position by the fluid from the accumulator 226 via the second branch line 230 and the secondary supply line 216. In this manner, the fourth check valve 260 prevents any flow of fluid from the accumulator 226 to the non-operational pump 206 i.e., to the pump 206 when the pump 206 has failed.

In embodiments of this disclosure, it is contemplated that a size of the accumulator 224 is large enough to store an adequate amount of pressurized fluid therein such that when the pump 206 is inoperative, the accumulator 224 can supply the charge of pressurized fluid to the steering system 202 for at least a pre-determined amount of time, the pre-determined amount of time being sufficiently large enough for an operator of the machine to steer the machine to safety, for example, to the side of a road.

Referring to the illustrated embodiment of FIG. 2, the hydraulic system 200 may also include a first sensor 250, a second sensor 252, and a controller 254 disposed in electrical communication or otherwise connected in sensing communication with the first and second sensors 250, 252 to receive signals therefrom. The first sensor 250 may be associated with the accumulator 224 and configured to sense or detect, output, and communicate a signal indicative of or corresponding to the pressure of fluid present in the accumulator 224 to the controller 254. The second sensor 252 may be disposed in the second branch line 230 and located at a point between the second check valve 232 and the accumulator 224. The second sensor 252 may be configured to output a pressure of fluid upstream of the accumulator 224.

In regards to the preceding embodiment, the controller 254 is configured to determine from the outputs of the first and second sensors 250, 252 if the pressure of fluid upstream of the accumulator 224 i.e., in the second branch line 230 has fallen below a pre-determined level, and if the pressure of fluid in the accumulator 224 has fallen to a value coterminous with a loss of pressure upstream of the accumulator 224. If so, the controller 254 may be further configured to provide a warning signal via a display device 256 communicably coupled to the controller 254. The warning signal being provided via the display device 256 to the operator would be suggestive of halting the vehicle 100. This way, the operator of the vehicle 100 may steer the vehicle 100 to safety, for example, to the side of a road before the charge of pressurized fluid from the accumulator 224 depletes to a level insufficient to continue operation of the steering system 202.

It may be noted that in embodiments of the present disclosure, the controller 254 is configured with suitable algorithms, programs, circuitry such as, but not limited to, power supply circuitry, signal conditioning circuitry, solenoid driver circuitry, alarm driving circuitry, and the like for executing functionality consistent with the present disclosure. Moreover, algorithms and programs associated with the controller 254 can reside on one or more devices known to persons skilled in the art. Some examples of such devices may include, but is not limited to, read only memory (ROM), random access memory (RAM), floppy disks, compact disks, portable hard disks, and the like. Such devices may be contemplated and suitably implemented by one skilled in the art, in conjunction with the controller 254 to execute functions that are consistent with the present disclosure.

INDUSTRIAL APPLICABILITY

Embodiments of the present disclosure have applicability for implementation and use in improving a reliability and safety of steering systems in use. With implementation of the hydraulic system 200 disclosed herein, steering systems having a pump that is subject to failure can be configured to provide additional time to an operator of a vehicle for steering the vehicle to safety. Moreover, with use of the hydraulic system 200 disclosed herein, a response time required by the accumulator 224 to restore fluid pressure in the secondary supply line 216 for operating the steering system 202 is minimized in that the response time is shortened significantly as compared to traditionally known electrically-operated secondary pumps that typically require a longer duration to be energized and thereafter restore the fluid pressure required for operating the steering system when a primary pump is subject to failure.

The hydraulic system 200 of the present disclosure is simple in construction yet effective in providing the required amount of pressurized fluid for at least a pre-determined period of time for the operator of the vehicle to steer the vehicle to safety when the pump is subject to failure. The hydraulic system 200 disclosed herein therefore helps the operator of the vehicle to prevent any untoward damage to the vehicle by allowing the operator to conveniently steer the vehicle when the pump is rendered non-operational. When operational, the accumulator 224 also assists the pump's function by supplementing the required flow of fluid to support the load and operation of the steering system 202.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic system for a steering system of a vehicle, the hydraulic system comprising:
    a pump configured to output pressurized fluid via a primary supply line coupled to an output port of the pump;
    a priority valve disposed downstream of the pump and located in the primary supply line, the priority valve configured to allow pressurized fluid from the pump to selectively flow to the steering system via a secondary supply line disposed downstream of the priority valve and coupled to the steering system;
    a first branch line configured to branch-off from the primary supply line, the first branch line having:
        a spring-loaded pilot-operated pressure reducing valve having a pre-set reducing pressure for opening the pressure reducing valve in accordance with the pre-set reducing pressure; and
        an accumulator disposed downstream of the pressure reducing valve and fluidly coupled thereto, wherein the first branch line is configured to charge the accumulator with pressurized fluid from the pump when the pump is normally operational and the pressurized fluid from the pump is one of equal to or greater than the pre-set reducing pressure associated with the pressure reducing valve; and
    a second branch line configured to branch-off from the secondary supply line and fluidly couple with the accumulator, the second branch line configured to communicate pressurized fluid from the accumulator to the steering system via the secondary supply line for facilitating operation of the steering system when the pump is non-operational.

2. The hydraulic system of claim 1, wherein the first branch line includes a first check valve disposed therein and located between the pressure reducing valve and the accumulator, the first check valve configured to prevent a flow of pressurized fluid from the accumulator to the pressure reducing valve.

3. The hydraulic system of claim 2, wherein the first check valve is set to open with a pressure setting lower than the pre-set reducing pressure of the pressure reducing valve to facilitate an unidirectional flow of pressurized fluid from the pump to the accumulator via the pressure reducing valve.

4. The hydraulic system of claim 3 further comprising a third branch line configured to branch-off from a point in the first branch line between the pressure reducing valve and the first check valve, wherein the third branch line includes:
    a third check valve disposed therein, the third check valve configured to allow an unidirectional flow of pressurized fluid from the pressure reducing valve for regulating a displacement of the pump via a resolver valve that receives a load pressure signal from a pressure differential system located sequentially between the third check valve and the pump.

5. The hydraulic system of claim 3 further comprising a first orifice disposed in the first branch line and located between the first check valve and the accumulator, the first orifice configured to regulate a flow-rate of pressurized fluid from the pressure reducing valve to the accumulator.

6. The hydraulic system of claim 1 further comprising a second check valve disposed in the second branch line and located between the accumulator and the secondary supply line, the second check valve configured to allow fluid to flow from the accumulator to the steering system via the second branch line when the pump is non-operational and a pressure of fluid in the secondary supply line becomes less than a pressure of fluid in the accumulator.

7. The hydraulic system of claim 6 further comprising a bypass line disposed in parallel to the second check valve and fluidly coupled to the second branch line upstream and downstream of the second check valve, the bypass line having a second orifice disposed therein for regulating a flow-rate of fluid being routed from the secondary supply line to the accumulator via the bypass line.

8. The hydraulic system of claim 7, wherein the second orifice is configured to allow:
fluid to return from the steering system to the accumulator via the bypass line when the steering system is operational; and
fluid to flow from the accumulator to the steering system via the bypass line when the steering system is non-operational.

9. The hydraulic system of claim 8 further comprising:
a first sensor associated with the accumulator, the first sensor configured to output a pressure of fluid present in the accumulator; and
a second sensor disposed in the second branch line and located at a point between the second check valve and the accumulator, the second sensor configured to output a pressure of fluid upstream of the accumulator.

10. The hydraulic system of claim 9 further comprising a controller disposed in communication with the first and second sensors, the controller configured to:
determine from the outputs of the first and second pressure sensors:
if the pressure of fluid upstream of the accumulator is below a pre-determined level, and
if the pressure of fluid in accumulator has fallen coterminous with a loss of pressure upstream of the accumulator, and if so,
provide a warning signal via a display device communicably coupled to the controller, the warning signal being suggestive of halting the vehicle.

11. A vehicle comprising:
at least a pair of wheels;
a steering system associated with the pair of wheels; and
a hydraulic system fluidly coupled with the steering system, the hydraulic system comprising:
a pump configured to output pressurized fluid via a primary supply line coupled to an output port of the pump;
a priority valve disposed downstream of the pump and located in the primary supply line, the priority valve configured to selectively allow pressurized fluid from the pump to flow to the steering system via a secondary supply line downstream of the priority valve and coupled to the steering system;
a first branch line configured to branch-off from the primary supply line, the first branch line having:
a spring-loaded pilot-operated pressure reducing valve having a pre-set reducing pressure for opening the pressure reducing valve in accordance with the pre-set reducing pressure; and
an accumulator disposed downstream of the pressure reducing valve and fluidly coupled thereto, wherein the first branch line is configured to charge the accumulator with pressurized fluid from the pump when the pump is normally operational and the pressurized fluid from the pump is one of equal to or greater than the pre-set reducing pressure associated with the pressure reducing valve; and
a second branch line configured to branch-off from the secondary supply line and fluidly couple with the accumulator, the second branch line configured to communicate pressurized fluid from the accumulator to the steering system via the secondary supply line for facilitating operation of the steering system when the pump is non-operational.

12. The vehicle of claim 11, wherein the first branch line includes a first check valve disposed therein and located between the pressure reducing valve and the accumulator, the first check valve configured to prevent a flow of pressurized fluid from the accumulator to the pressure reducing valve.

13. The vehicle of claim 12, wherein the first check valve is set to open with a pressure setting lower than the pre-set reducing pressure of the pressure reducing valve to facilitate an unidirectional flow of pressurized fluid from the pump to the accumulator via the pressure reducing valve.

14. The vehicle of claim 13, wherein the hydraulic system further comprises a third branch line configured to branch-off from a point in the first branch line between the pressure reducing valve and the first check valve, wherein the third branch line includes:
a third check valve disposed therein, the third check valve configured to allow an unidirectional flow of pressurized fluid from the pressure reducing valve for regulating a displacement of the pump via a resolver valve that receives a load pressure signal from a pressure differential system located sequentially between the third check valve and the pump.

15. The vehicle of claim 13, wherein the hydraulic system further comprises a first orifice disposed in the first branch line and located between the first check valve and the accumulator, the first orifice configured to regulate a flow-rate of pressurized fluid from the pressure reducing valve to the accumulator.

16. The vehicle of claim 11, wherein the hydraulic system further comprises a second check valve disposed in the second branch line and located between the accumulator and the secondary supply line, the second check valve configured to allow fluid to flow from the accumulator to the steering system via the second branch line when the pump is non-operational and a pressure of fluid in the secondary supply line becomes less than a pressure of fluid in the accumulator.

17. The vehicle of claim 16, wherein the hydraulic system further comprises a bypass line disposed in parallel to the second check valve and fluidly coupled to the second branch line upstream and downstream of the second check valve, the bypass line having a second orifice disposed therein and configured to regulate a flow-rate of fluid being routed from the secondary supply line to the accumulator via the bypass line.

18. The vehicle of claim 17, wherein the second orifice is configured to allow fluid to return from the steering system to the accumulator when the steering system is operational.

19. The vehicle of claim 18, wherein the hydraulic system further comprises:
   a first sensor associated with the accumulator, the first sensor configured to output a pressure of fluid present in the accumulator; and
   a second sensor disposed in the second branch line and located at a point between the second check valve and the accumulator, the second sensor configured to output a pressure of fluid upstream of the accumulator.

20. The vehicle of claim 19, wherein the hydraulic system further comprises a controller disposed in communication with the first and second sensors, the controller configured to:
   determine from the outputs of the first and second pressure sensors:
      if the pressure of fluid upstream of the accumulator is below a pre-determined level, and
      if the pressure of fluid in the accumulator has fallen coterminous with a loss of pressure upstream of the accumulator, and if so,
   provide a warning signal via a display device communicably coupled to the controller, the warning signal being suggestive of halting the vehicle.

\* \* \* \* \*